Patented Aug. 5, 1924.

1,504,164

UNITED STATES PATENT OFFICE.

JOHN THOMAS, OF CARLISLE, ENGLAND, ASSIGNOR TO SCOTTISH DYES, LIMITED, OF CARLISLE, ENGLAND.

MANUFACTURE OF DYESTUFF INTERMEDIATES.

No Drawing. Application filed August 3, 1923. Serial No. 655,548.

*To all whom it may concern:*

Be it known that I, JOHN THOMAS, a subject of the King of Great Britain and Ireland, and residing at Murrell Hill Works, Carlisle, in the county of Cumberland, England, have invented certain new and useful Improvements in and Relating to the Manufacture of Dyestuff Intermediates, of which the following is a specification.

This invention relates to the manufacture of intermediates for the production of dyestuffs and more particularly to the manufacture of 1-chlor-2-methyl-anthraquinone from 2-methyl-anthraquinone in such a way as to enable a complete process for the manufacture of anthraquinone-1-chlor-2-carboxylic acid to be obtained using 2-methyl-anthraquinone as the starting material.

The key to the invention is the treatment of 2-methyl-anthraquinone in concentrated sulphuric acid (this term in this specification or claims including weak oleum) with chlorine, the resulting solution being such that it may be directly submitted, that is to say, without isolation of intermediate bodies, to the action of a suitable oxidizing agent for the formation of anthraquinone-1-chlor-2-carboxylic acid and in those cases where the 2-methyl-anthraquinone is prepared by condensing para-toluoyl-benzoic acid with sulphuric acid or weak oleum this solution may be directly chlorinated so that a complete process for producing anthraquinone-1-chlor-2-carboxylic acid from para-toluoyl-benzoic acid is provided. The invention will be mainly described with reference to the complete process for the production of anthraquinone-1-chlor-2-carboxylic acid from para-toluoyl-benzoic acid.

In carrying the invention into effect in one form by way of example, 35 parts of para-toluoyl-benzoic acid are treated with 350 parts of weak oleum containing 5 per cent of free $SO_3$ in the usual way so as to form 2-methyl-anthraquinone; 0.35 parts of iodine are added and the melt may then be submitted to the action of dry chlorine, for example, at about 50°–60° C., or preferably an analysis is made and sufficient oleum added to bring the strength up to 3 per cent of free $SO_3$. The chlorination proceeds distinctly more rapidly in solutions containing free $SO_3$ than in sulphuric acid. Chlorine is passed in until the requisite increase in weight is obtained, after making due allowance for the solubility of chlorine in weak oleum.

Samples may be also withdrawn from time to time and the melting point determined. When the melting point has dropped below 150° C., chlorination is proceeded with cautiously and determinations of the percentage of chlorine are taken. When the chlorine content is 13.8 to 14 per cent chlorination is stopped. The melting point at this stage is usually about 140 to 149° C. If it is desired to obtain 1-chlor-2-methyl-anthraquinone the melt at this point may be worked up.

The melt is then cooled and to it is added another 350 parts of sulphuric acid. It is then diluted by the addition of water until the strength of the acid is 80 per cent. This causes some of the 1-chlor-2-methyl-anthraquinone to be precipitated out. To this is then added 95 parts of finely powdered manganese dioxide and the temperature is allowed to rise to about 110° C. and kept at this for some hours. When oxidation is complete the melt is run down to water and should there be any unchanged manganese dioxide present, this is removed by adding some bisulphite and boiling. On cooling, the solution is filtered and the crude anthraquinone-1-chlor-2-carboxylic acid isolated. After purification, the yield is about 30 to 32 parts of the required acid.

The chlorination can be carried out in iron towers.

The chlorinations can be carried out at temperatures different from those given above, the best conditions being used for the particular body required.

The proportions of iodine used can also be varied.

The following example illustrates a modified process according to the present invention:—

The production of anthraquinone-1-chlor-2-carboxylic acid from para-toluoyl-benzoic acid may be conveniently carried out as follows:—

A jacketed stirrer pan is charged with 733 lbs. of 5 per cent oleum and to this is added 77 lbs. of powdered para-toluoyl-benzoic acid. The pan is then closed and the temperature raised to 90° C. during one hour. It is kept at this temperature for one hour and then raised to 100° C. and kept at 100°

C. for two hours, the contents being well stirred the whole time.

Cooling water is then turned on to the jacket of the pan and 170 lbs. of 20 per cent oleum are added. After a thorough mixing a sample is taken and the percentage of free $SO_3$ estimated. This is generally between 3 and 5 per cent and chlorination is commenced. Steam is turned on to the jacket and the temperature of the contents of the pan raised to 70° C. and the charge is circulated through a tower packed with iron borings, earthenware or other suitable material. Chlorine is passed in to the tower at the rate of 1 lb. every five minutes until 23 lbs. of chlorine have been passed in.

After this, a sample is drawn from the pan and the 1-chlor-2-methyl-anthraquinone isolated and analysed for chlorine. If the chlorine content is 13.5 per cent or over, as is usually the case, the charge is blown into a cast iron jacketed pan containing 560 lbs. of sulphuric acid.

The whole charge is then diluted to 80 per cent sulphuric acid by adding 350 lbs. of water. During the addition of water the temperature is raised to 90° C. and kept at 90°. When all the water is in 209 lbs. of powdered manganese dioxide is added over a period of 6 hours, the temperature being kept between 90° and 100° C. The mixture is kept for a further four hours at 100° C.

The contents of the pan are then drowned in 600 gallons of cold water and 33 lbs. of sodium bisulphite solution added and the whole boiled until the colour of the contents is a bright yellow. The suspension is then cooled to 30° C., further diluted with cold water and filtered off and washed in the usual way.

The crude paste can be further purified from insoluble matter by dissolving in caustic soda, filtering and reprecipitating by pouring into acid.

If 1-chlor-2-methyl-anthraquinone is desired this product is obtained by blowing the contents of the pan after chlorination is complete into water and isolating by filtration and washing in the usual way.

If desirable or more convenient 2-methyl-anthraquinone from other sources can be used and subjected to chlorination by dissolving it in 10 to 12 times its weight of 5 per cent oleum and then proceeding as outlined above.

Having now described my invention what I claim as new and desire to secure by Letters Patent is:—

1. The process which consists in chlorination of 2-methyl-anthraquinone and direct oxidation of the product of the aforesaid chlorination all while dissolved in strong sulphuric acid with no isolation of intermediate products.

2. The process which consists in the condensation of para-toluoyl-benzoic acid in a sufficient excess of concentrated sulphuric acid so that sulphuric acid remains in the product, chlorination of the solution thus obtained, and oxidation of the resulting product, with no isolation of intermediate bodies.

In testimony whereof I have signed my name to this specification.

JOHN THOMAS.